(12) United States Patent
Misani et al.

(10) Patent No.: US 9,145,031 B2
(45) Date of Patent: Sep. 29, 2015

(54) TYRES FOR MOTOR VEHICLES

(75) Inventors: Pierangelo Misani, Milan (IT); Mario Mariani, Milan (IT); Andrea Schiavolin, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 896 days.

(21) Appl. No.: 13/141,974

(22) PCT Filed: Dec. 24, 2008

(86) PCT No.: PCT/IT2008/000801
§ 371 (c)(1),
(2), (4) Date: Jun. 23, 2011

(87) PCT Pub. No.: WO2010/073281
PCT Pub. Date: Jul. 1, 2010

(65) Prior Publication Data
US 2011/0259491 A1 Oct. 27, 2011

(51) Int. Cl.
B60C 11/03 (2006.01)
B60C 11/117 (2006.01)
B60C 11/24 (2006.01)

(52) U.S. Cl.
CPC ........... B60C 11/0302 (2013.04); B60C 11/032 (2013.04); B60C 11/0306 (2013.04); B60C 2011/0381 (2013.04); B60C 2200/10 (2013.04); Y10T 152/10027 (2015.01)

(58) Field of Classification Search
CPC .. B60C 11/032; B60C 11/0318; B60C 11/24; B60C 11/033; B60C 2011/0381; B60C 2200/10; B60C 2011/0383; B60C 2011/0374; B60C 2011/0379
USPC ............... 152/209.3, 209.11, 209.25, 209.18, 152/154.2, 209.28, 903, 904
See application file for complete search history.

(56) References Cited

U.S. PATENT DOCUMENTS

| 6,200,401 | B1 | 3/2001 | Watkins et al. | |
| 6,276,415 | B1 * | 8/2001 | Nakamura | 152/209.11 |
| 2006/0219342 | A1 | 10/2006 | Steinbach | |

FOREIGN PATENT DOCUMENTS

| EP | 0 906 836 | 4/1999 |
| WO | WO-2005/005169 | 1/2005 |
| WO | WO-2008/124899 | 10/2008 |

OTHER PUBLICATIONS

International Search Report from the European Patent Office for International Application No. PCT/IT2008/000801 (Mail date Sep. 11, 2009 ).

*Primary Examiner* — Eric Hug
(74) *Attorney, Agent, or Firm* — Finnegan, Henderson, Farabow, Garrett & Dunner, L.L.P.

(57) ABSTRACT

A tire for motor vehicles, having a tread band extending around a rotation axis includes an annular central portion astride an equatorial plane of the tire, two annular shoulder portions arranged on axially opposite sides with respect to the annular central portion and two annular side portions each arranged between the annular central portion and a respective annular shoulder portion, the tread band having at least one module replicated along a circumferential direction of the tire and including at least one plurality of primary grooves inclined with respect to the equatorial plane and arranged at least on the annular portions, and at least one plurality of secondary recesses arranged mainly on the annular central portion and on at least one annular side portion, wherein a substantial disappearance of the secondary recesses determines a difference in the empty/solid ratio on the annular central and side portions between a new tire and a tire that has travelled at least 2000 km greater than 1.7%.

13 Claims, 5 Drawing Sheets

TYRES FOR MOTOR VEHICLES

CROSS REFERENCE TO RELATED APPLICATION

This application is a national phase application based on PCT/IT2008/000801, filed Dec. 24, 2008.

BACKGROUND OF THE INVENTION

1. Field of the Invention

The present invention relates to tyres for motor vehicles, i.e. tyres having a high transversal curvature so as to offer an adequate contact surface with the road surface when the motor vehicle is leaning to turn a bend.

2. Description of the Related Art

Preferably, the tyres to which the present invention refers are intended to be used in motor vehicles of the "Sport Touring" type, i.e. sports motor vehicles intended to offer high performance in terms of power, comfort and mileage on motorways and streets, in cities and/or outside cities, with a wet or dry road surface.

"Sport Touring" motor vehicles typically have a large piston displacement (equal to or greater than 800 cm$^3$) and/or high power (equal to or greater than 110 HP). However, on the market there are already motor vehicles having a piston displacement even as much as 1250 cm$^3$ and power equal to 150 HP.

It is known that the tyres for such motor vehicles must ensure high performance on any type of road surface (wet, dry, regular and/or irregular asphalt, slippery ground) and/or route (city streets, motorways, mountain roads with a large number of bends etc.).

Such tyres must also ensure driving stability, controllability, directionality, road-holding, high mileage and regular wear.

Amongst the aforementioned characteristics, of particular importance, in the specific case of tyres for front wheels, is the water drainage. Indeed, it is essential for the tyre of the front wheel of motor vehicles to be able to ensure effective water drainage, so that the tyre of the rear wheel, travelling in a straight line on the drained asphalt, can effectively discharge the power to the ground. On the other hand, in the specific case of tyres for rear wheels, of particular importance is the traction and behavioural stability on any type of road surface and distance covered.

For the aforementioned reasons a plurality of grooves are formed on the tread band of the tyre, which extend substantially from the annular central portion of the tread band up to the opposite annular shoulder portions.

The behaviour of the tyre during travel is greatly influenced by the number, orientation, distribution and shape of such grooves, and thus by the particular pattern of the tread band.

EP 0 906 836 describes a tyre for a motor vehicle the tread band of which comprises a central region astride of an equatorial plane of the tyre and two shoulder regions arranged on axially opposite sides with respect to the central region. In the tread band a plurality of grooves are formed that extend from opposite sides with respect to the equatorial plane starting from the equatorial plane itself up to the shoulder regions and according to a direction that in the central region is substantially circumferential, in the shoulder regions is substantially transversal and in the intermediate regions progressively changes from substantially circumferential to substantially transversal proceeding from the equatorial plane towards the shoulder regions. The grooves formed on one side of the tyre with respect to the equatorial plane thereof are staggered along the circumferential direction with respect to the corresponding grooves formed on the other side of the tyre.

SUMMARY OF THE INVENTION

The Applicant has realised that, in particular for tyres for motor vehicles, the pattern of the tread band as well as solving technical problems, also possesses a strong communicative value.

The Applicant has, indeed, realised that since the tread band is one of the most visible parts of the tyre, the tread pattern formed by the grooves made on it possesses a great suggestive and communicative power, capable of influencing the consumer's choices. The Applicant has, therefore, considered the problem of how to make the appearance of the tyre suggestive and communicative without weakening the structure of the tread band, i.e. keeping the driving characteristics, such as stability, controllability, directionality, road-holding and regular wear thereof.

The Applicant has observed that a new tyre needs to travel a certain number of kilometers in order to reach the optimal operating conditions thereof, and can allow the user to drive his motor vehicle with better performance and more freely, appreciating at full the characteristics thereof.

The Applicant has also considered the problem of how to use the tread pattern to communicate to the user of a motor vehicle a message relative to the possibility of using his motor vehicle with a tyre that has reached its optimal conditions in full safety. All of this, saving the technical characteristics of the tread band.

The Applicant has found that the problems outlined above are mutually contrasting.

The Applicant has found that the problems outlined above are solved through a tread pattern comprising graphical elements obtained through recesses that disappear after a certain time due to the wear of the tyre, preferably in the central area thereof, leaving the characteristics of steering, stability, grip and water drainage of the tyre substantially unaltered.

The Applicant has found that the presence of recesses of limited but significant depth, located in particular in the central portion of the tread band, can improve the characteristics of the new tyre over the first kilometers of use, i.e. at a stage when the tyre does not yet fully fulfil its potentiality due to structural and mixture problems.

In a first aspect, the present invention relates to a method for indicating to the driver of a motor vehicle, preferably a high-performance motor vehicle, the possibility of using his motor vehicle with the tyre that has reached optimal use conditions, in which said signal is communicated by a discontinuity in the tread pattern before a first predetermined number of kilometers, such a discontinuity being in the form of a reduction in the empty/solid ratio and/or in the change of pattern of the tread itself.

Preferably, said discontinuity becomes evident after a second predetermined number of kilometers that is lower than the first number of kilometers.

In another aspect, the present invention relates to a tyre for motor vehicles, having a tread band comprising an annular central portion (A) astride of an equatorial plane (X-X) of the tyre, two annular shoulder portions (B) arranged on axially opposite sides with respect to the annular central portion (A) and two annular side portions (C) each arranged between the annular central portion (A) and a respective annular shoulder portion (B), the tread band having at least one module (T$_1$; T'$_2$) replicated along a circumferential direction of the tyre and comprising:

at least one plurality of primary grooves inclined with respect to the equatorial plane (X-X) and arranged at least on the annular side (C) and shoulder (B) portions;

at least one plurality of secondary recesses arranged mainly on the annular central portion (A) and on at least one annular side portion (C);

wherein there is a substantial disappearance of the plurality of secondary recesses after a predetermined number of kilometers, that is substantially low starting from the first use of the tyre (i.e. corresponding to a consolidation or running-in period of the tyre itself).

The present invention can, in the preferred aspects thereof, have one or more of the following preferred characteristics.

Advantageously, the secondary recesses comprise secondary grooves arranged to form, jointly with the primary grooves, a first pattern.

Preferably, the substantial disappearance of the secondary recesses in the tyre that has traveled a substantially low predetermined number of kilometers starting from the first use of the tyre is such that the primary grooves define a second pattern visibly different from the first one.

The Applicant has found that a tread pattern formed from two different types of grooves, one of which disappearing after a certain number of kilometers, offers the user of the motor vehicle a visible indication that the tyre is "run in" and can therefore allow higher performance driving.

In other words, the disappearance of one of the patterns can be recognised by the user of the motor vehicle as an indication that the tyre has reached its optimal operating conditions, so that it is possible to drive with better performance fully appreciating the characteristics thereof.

Preferably, the secondary grooves are arranged symmetrically with respect to the equatorial plane.

Preferably, the substantial disappearance of the secondary recesses determines a difference in empty/solid ratio on the annular central (A) and side (C) portions between a new tyre and a tyre that has traveled a distance of around 2000 km greater than 1.5%.

Preferably, the substantial disappearance of the secondary recesses at least on the annular central (A) and side (C) portions with respect to the new tyre occurs for a tyre that has traveled a distance of around 1500 km, more preferably around 1000 km.

Preferably, the substantial disappearance of the secondary recesses at least on the annular central (A) and side (C) portions with respect to the new tyre occurs for a tyre that has traveled a distance of around 750 km, more preferably around 500 km.

Preferably, the substantial disappearance of the secondary recesses at least on the annular central portion (A) with respect to the new tyre occurs for a tyre that has traveled a distance of around 100 km, more preferably around 200 km.

The secondary recesses, jointly with the primary grooves, can ensure a greater communicative and suggestive value to the tread band without impairing the technical characteristics thereof. The substantial disappearance, at least in the annular central portion (A) and annular side portions (C), of the secondary recesses that occurs in the first kilometers of travel of the tyres determines a variation of the empty/solid ratios.

Such a variation, visible to the user of the motor vehicle, can be recognised as an indication that the tyre has reached its optimal operating conditions, so that it is possible to drive with better performance and fully appreciate the characteristics thereof.

On the other hand, the presence of the secondary recesses improves the characteristics of the new tyre over the first kilometers of use, i.e. at a stage in which the tyre does not yet fully fulfil its potentiality.

Throughout the present description and in the subsequent claims, the terms "axial" and/or "axially" are used to indicate a direction substantially perpendicular to the equatorial plane of the tyre, i.e. a direction substantially parallel to the rotation axis of the tyre. The terms "circumferential" and/or "circumferentially", on the other hand, are used to indicate a direction substantially parallel to the equatorial plane of the tyre along the annular extension of the tyre itself.

In the present description and in the subsequent claims by "empty/solid" ratio we mean the value of the ratio detectable in a portion of the tyre footprint area between the tread portions occupied by recesses, notches and/or grooves (empty) and, therefore, without any physical contact with the ground, and the extension of the portion of the tyre footprint area itself.

For the purposes of the present definition, all of the recesses, notches and/or grooves of the tread band which is object of calculation are considered irrespective of the depth or width thereof.

In the tyre of the present invention, the aforementioned annular central portion and the aforementioned opposite annular side portions are defined in a central area of the tyre intended to come into contact with the road surface when the motor vehicle travels in a straight line or slightly leaning. Otherwise, the aforementioned side shoulder portions are mainly defined in respective shoulder areas of the tyre intended to come into contact with the road surface when the motor vehicle turns a bend leaning to a greater extent.

According to a particularly advantageous choice, the substantial disappearance of the secondary recesses determines a difference in the empty/solid ratio on at least one annular side portion (C) between a new tyre and a tyre that has traveled a distance of around 2000 km greater than or equal to 4%.

Preferably, the substantial disappearance of the secondary recesses determines a difference in empty/solid ratio on at least one annular shoulder portion (B) between a new tyre and a tyre that has traveled a distance of around 2000 km smaller than or equal to 1.7%.

According to an advantageous choice the central (A) and side (C) portions each have an empty/solid ratio greater tan 7% when the tyre is new.

Preferably, the central (A) and side (C) portions after 2000 km of travel of the tyre have an empty/solid ratio smaller than 20%.

Advantageously, the plurality of secondary recesses is arranged at least in a minimal part on at least one of the annular shoulder portions (B).

The secondary recesses of said plurality of secondary recesses have a depth no greater than 1 mm, preferably no greater than 0.7 mm.

Preferably, the secondary recesses of said plurality of secondary recesses have a depth no smaller than 0.1 mm, preferably no smaller than 0.2 mm.

The secondary recesses are arranged to form, together with the primary grooves, a first pattern, a decorative element or a graphical mark.

The primary grooves are arranged symmetrically with respect to the equatorial plane.

Advantageously, the secondary recesses can be grooves.

For the purposes of the present invention, a groove is a recess formed from a continuous line that is open or closed, rectilinear or curved, or formed from rectilinear and/or curvilinear portions with different angulations with respect to the equatorial plane.

According to a particularly advantageous choice the secondary recesses are arranged symmetrically with respect to the equatorial plane.

The secondary recesses of the portion A and of the portions C in a tyre that has traveled at least 2000 km are substantially removed.

Preferably, once the secondary recesses of the tread band of the portion (A) and of the portions (C) disappear after the tyre has traveled a distance of around 2000 km, the primary grooves make a second pattern, a decorative element or a graphical mark different from said first pattern.

Advantageously, the plurality of secondary recesses of each module ($T'_1$; $T'_2$) extends in the circumferential direction for a portion no greater than 30% of the circumferential extension of the tread band.

Preferably, the present invention relates to a pair of tyres for motor vehicles comprising a front tyre and a rear tyre to be mounted respectively on a front wheel and on a rear wheel of a two-wheeled vehicle, each tyre of the pair having a tread band comprising an annular central portion (A) astride of an equatorial plane (X-X) of the tyre, two first annular shoulder portions (B) arranged on axially opposite sides with respect to the annular central portion (A) and two annular side portions (C) each arranged between the annular central portion (A) and a respective first annular shoulder portion (B), the tread band having at least one module ($T'_1$; $T'_2$) replicated along a circumferential direction of the tyre and comprising:
- at least one plurality of primary grooves that are opposite one another with respect to the equatorial plane (X-X) and arranged at least on the annular side (C) and shoulder (B) portions;
- at least one plurality of secondary recesses arranged for the most part on the annular central portion (A) and on at least one annular side portion (C);

wherein the substantial disappearance of the secondary recesses determines a difference in the empty/solid ratio on the annular central portion (A) between a new rear tyre and a rear tyre that has traveled a distance of around 2000 km greater than or equal to 4%.

Preferably, the substantial disappearance of the secondary recesses determines a difference in the empty/solid ratio on the annular side portion (C) between a new rear tyre and a rear tyre that has traveled a distance of around 2000 km greater than 4%.

Advantageously, the substantial disappearance of the secondary recesses determines a difference in the empty/solid ratio on the side shoulder portion (B) between a new rear tyre and a rear tyre that has traveled a distance of around 2000 km smaller than or equal to 2%.

Preferably, the substantial disappearance of the secondary recesses determines a difference in the empty/solid ratio on at least one annular shoulder portion (B) between a new rear tyre and rear tyre that has traveled a distance of around 2000 km smaller than or equal to 0.5%.

BRIEF DESCRIPTION OF THE DRAWINGS

Further characteristics and advantages of the tyre of the present invention shall become clearer from the following detailed description of some preferred embodiments thereof, made with reference to the attached drawings only as examples and not for limiting purposes. In such drawings.

DETAILED DESCRIPTION OF THE INVENTION

Figure 1:
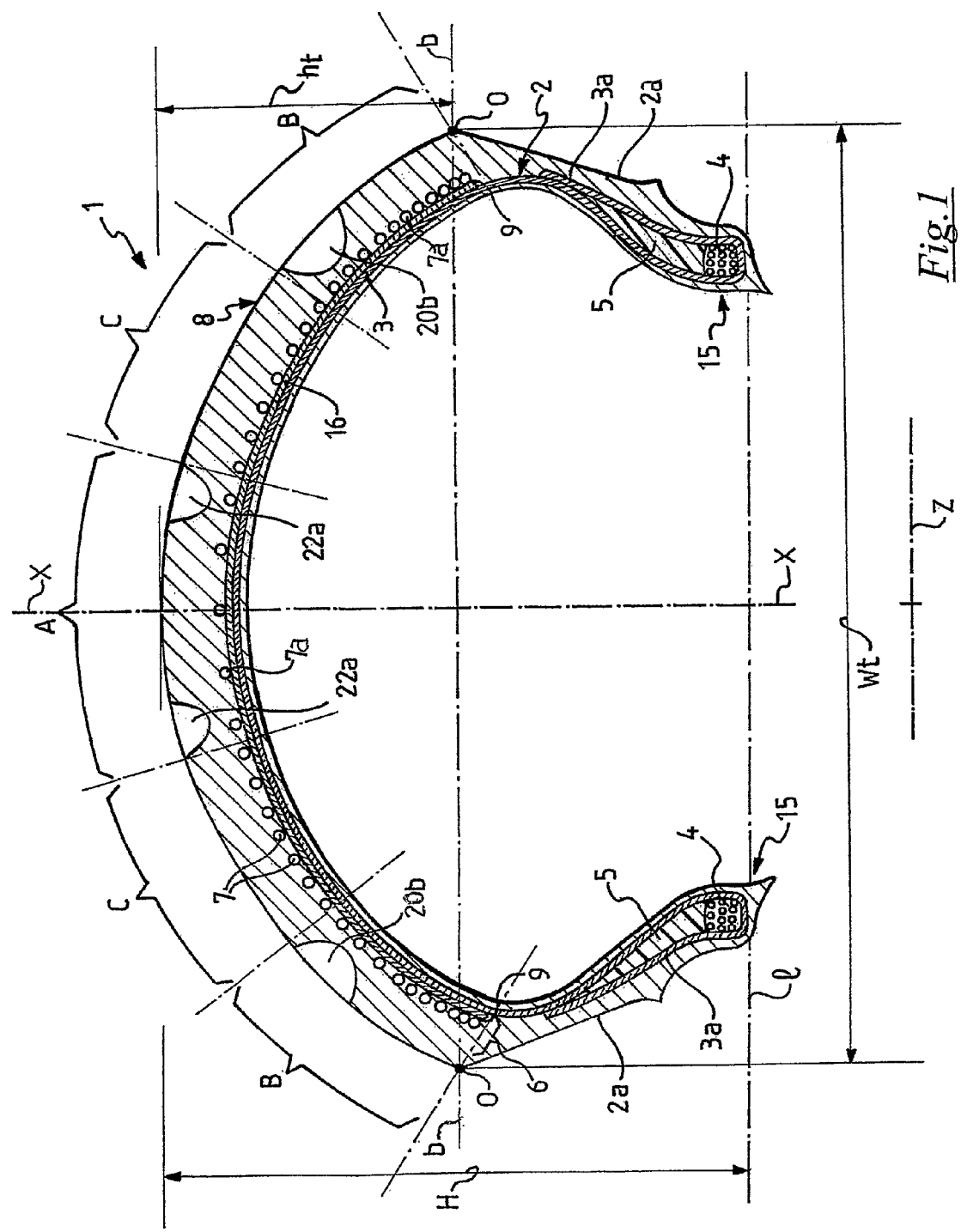
FIG. 1 shows a radial section view of a rear tyre according to the invention, the section being made according to the line I-I of FIG. 3.

In FIG. 1, a tyre for wheels of motor vehicles according to the present invention is wholly indicated with 1. In particular, it is a tyre intended to be used on the rear wheel of a motor vehicle of the "Sport Touring" type.

In the tyre 1 an equatorial plane X-X and a rotation axis Z are defined. A circumferential direction (indicated in FIG. 2 with the arrow R orientated in the direction of rotation of the tyre) and an axial direction perpendicular to the equatorial plane X-X are also defined.

The tyre 1 comprises a carcass structure 2 having a central crown portion 16 including at least one carcass ply 3, described in greater detail later on.

The carcass structure 2 is preferably coated on the inner walls thereof by a liner, essentially consisting of a layer of airtight elastomeric material, suitable for ensuring the hermetic seal of the tyre itself once inflated.

The carcass ply 3 is engaged, at the axially opposite side edges 3a thereof, with respective annular reinforcing structures 4 intended to hold the tyre on a corresponding mounting rim. The annular reinforcing structures 4 are typically known as "bead cores".

On the outer perimeter edge of the bead cores 4 a tapered elastomeric filler 5 is applied that occupies the space defined between the carcass ply 3 and the corresponding turned up side edge 3a of the carcass ply 3.

In an alternative embodiment, not illustrated, the carcass ply has the opposite side edges thereof associated without turning up with special annular reinforcing structures provided with two metallic annular inserts. In this case, a filler of elastomeric material can be arranged in an axially outer position with respect to the first annular insert. The second annular insert, on the other hand, is arranged in an axially outer position with respect to the end of the carcass ply. Finally, in an axially outer position with respect to said second annular insert, and not necessarily in contact with it, a further filler which terminates the manufacturing of the annular reinforcing structure can be provided.

As known, the area of the tyre comprising the bead core 4 and the filler 5 forms the so-called "bead", globally indicated in FIG. 1 with 15, intended to fix the tyre on a corresponding mounting rim, not shown.

In a radially outer position with respect to the aforementioned carcass structure a belt structure 6 is provided, also described in greater detail later on.

In a radially outer position with respect to the belt structure a tread band 8 is provided, through which the tyre 1 makes contact with the ground.

The tyre can also comprise a pair of sidewalls 2a applied to the side of the carcass structure 2 on axially opposite sides of the equatorial plane X-X. The sidewalls extend from the tread band 8 to the bead 15 of the tyre.

The tyre 1 of the present invention is characterised by a high transversal curvature and lowered sidewalls.

As known, the transversal curvature of a tyre is defined by the particular value of the ratio between the distance ht (FIG. 1) of the top of the tread band from the line b-b passing through the ends O of, the tread, measured on the equatorial plane X-X, and the distance wt between said ends of the tread band. Should the ends of the tread band not be easily identifiable, for example due to the lack of a precise reference like for example the edge indicated in FIG. 1 with O, the distance wt can certainly be assumed to be the measurement of the maximum chord of the tyre.

The value of the aforementioned transversal curvature is called "curvature ratio" or, usually, "tread camber".

The tyre 1 of the present invention preferably has a curvature ratio greater than or equal to 0.2, preferably greater than or equal to 0.28, for example 0.30. Such a curvature ratio is however smaller than or equal to 0.8, preferably smaller than or equal to 0.5. As for the sidewalls, on the other hand, the tyre 1 of the present invention has a ratio between the height H, measured on the equatorial plane X-X between the top of the tread band and the fitting diameter, defined by the reference line l passing through the beads of the tyre, and the distance ht smaller than 0.7, more preferably smaller than 0.5, for example 0.38.

The carcass ply 3 is preferably made from elastomeric material and comprises a plurality of reinforcing elements (not illustrated) arranged parallel to one another.

The reinforcing elements included in the carcass ply 3 preferably comprise textile cords selected from those usually adopted in the manufacture of carcasses for tyres, for example nylon, rayon, PET, PEN, with an elementary wire having a diameter of between 0.35 mm and 1.5 mm.

The belt structure 6 preferably comprises one or more rubberized cords 7, arranged parallel and side-by-side in the axial direction on the crown portion 16 of the carcass structure 2, to form a plurality of coils 7a. Such coils are substantially orientated according to the rolling direction of the tyre (typically with an angle of between 0° and 5°), such a direction usually being known as "at zero degrees" with reference to how it lies with respect to the equatorial plane X-X of the tyre. The aforementioned coils preferably extend over the entire crown portion 16 of the carcass structure 2.

Preferably, the belt structure 6 consists of windings of a single cord 7, or a tape of rubberized fabric comprising cords arranged side-by-side, preferably up to five, in a spiral from one extremity to the other on the crown portion 16 of the carcass structure 2.

Alternatively, the belt structure 6 can comprise at least two radially overlying layers, each consisting of elastomeric material reinforced with cords arranged parallel to one another. The layers are arranged in such a way that the cords of the first belt layer are orientated obliquely with respect to the equatorial plane of the tyre, whereas the cords of the second layer also have an oblique orientation, but symmetrically crossed with respect to the cords of the first layer, to form the so-called "cross-belt".

Preferably, the cords are made through steel wires with high carbon content (HT), in other words steel wires with a carbon content greater than 0.9%. In the case of use of textile cords, they can be made from synthetic fibre, for example nylon, rayon, PEN, PET, preferably synthetic fibre with high modulus, in particular synthetic aramid fibre (for example Kevlar® fibres). Alternatively, hybrid cords can be used comprising at least one wire with low modulus, in other words with a modulus no grater than 15000 N/mm² (for example nylon or rayon), interwoven with at least one wire with high modulus (for example Kevlar®), in other words with a modulus no smaller than 25000 N/mm².

Preferably, the belt structure 6 comprises a support layer consisting substantially of a sheet of elastomeric material arranged between the layer of cords 7 and the carcass ply 3 and on which the coils 7a are wound. The layer 9 preferably extends over a surface having an axial extension substantially corresponding to the surface on which the coils 7a extend. Alternatively, the layer 9 can extends over a surface smaller than the surface of extension of the coils 7a, for example only on opposite side portions of the belt structure 6.

An additional layer of elastomeric material is arranged between the belt structure 6 and the tread band 8. Such a layer preferably extends over a surface corresponding to the surface of extension of the belt structure 6. Alternatively, the aforementioned additional layer can extend over a surface smaller than the surface of extension of the belt structure 6, for example only on opposite side portions of the belt structure 6.

In a preferred embodiment of the tyre 1 of the present invention, at least one of the layer 1 and the aforementioned additional layer comprises short aramid fibres, for example in Kevlar®, dispersed in the elastomeric material.

Figure 2:
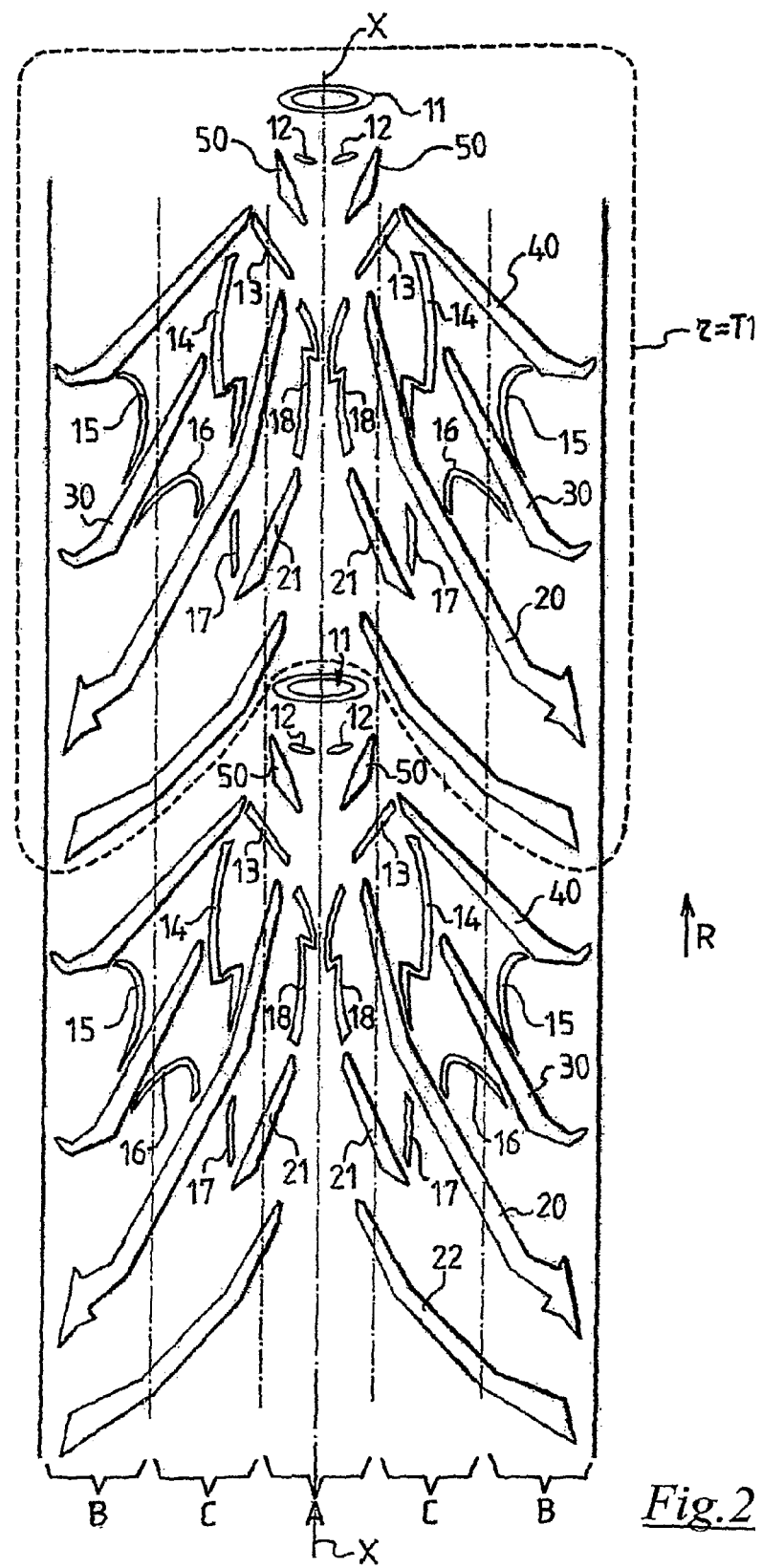
FIG. 2 shows a portion of the plan extension of a portion of the tread band of a new rear tyre according to a first embodiment.
Figure 3:
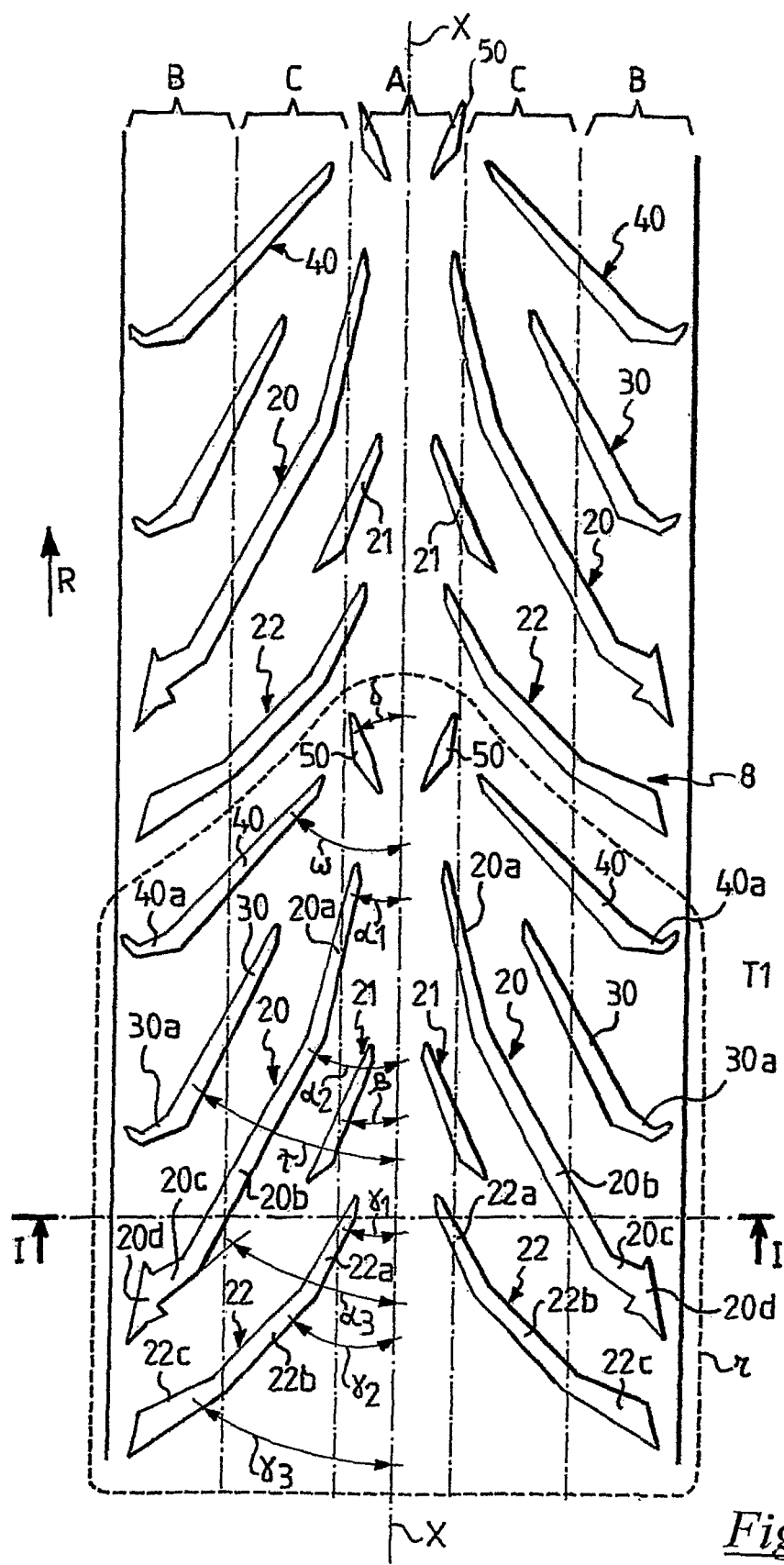
FIG. 3 shows a portion of the plan extension of a portion of the tread band of the rear tyre of FIG. 2 after having traveled about 2000 km.
Figure 4:
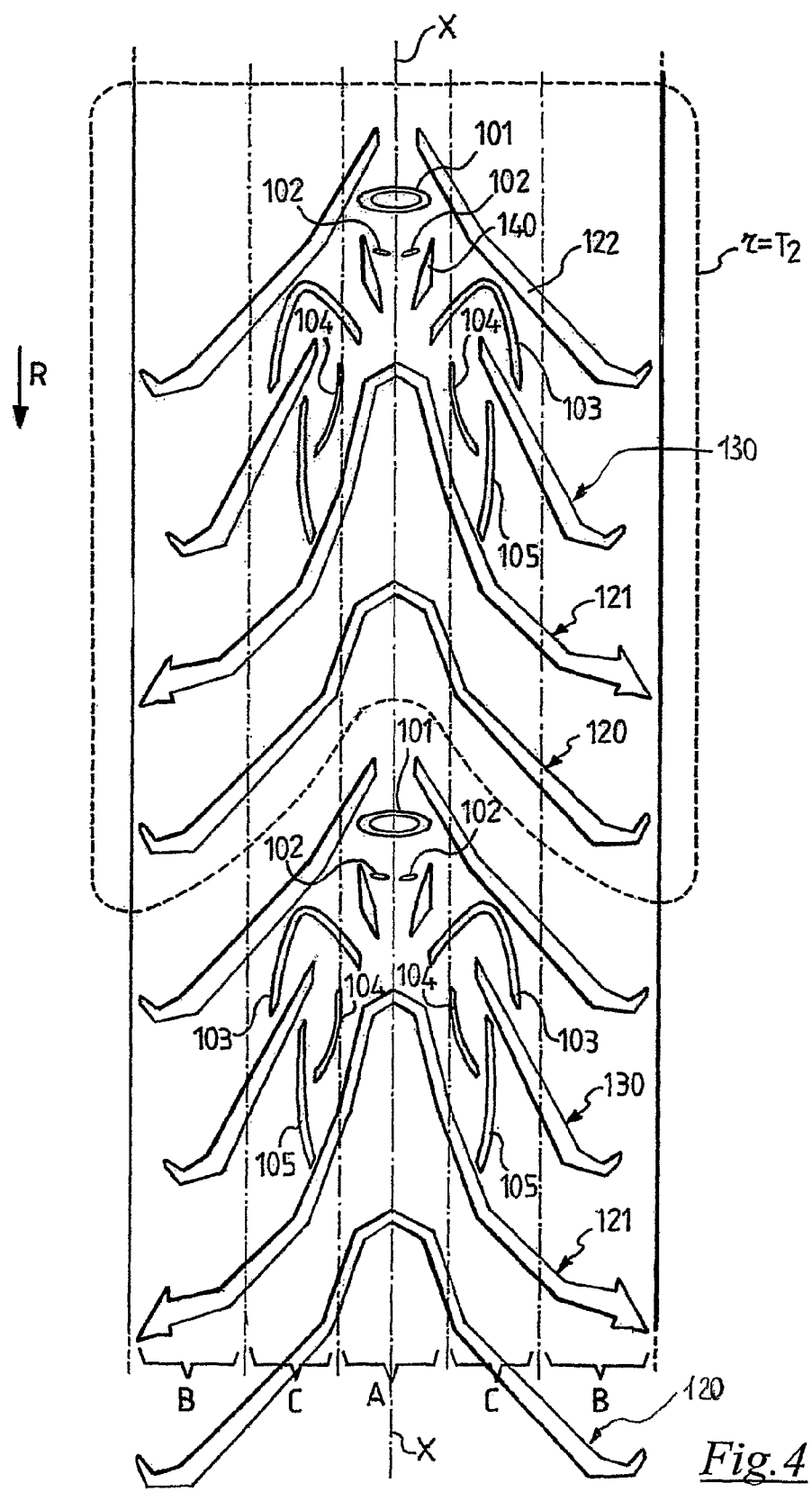
FIG. 4 shows a portion of the plan extension of a portion of the tread band of a new front tyre according to a first embodiment.

As better illustrated in FIGS. 2, 3 and 4, in the tread band 8 of the tyre it is possible to identify an annular central portion A arranged astride of the equatorial plane X-X, two first annular side portions C arranged on axially opposite sides with respect to the annular central portion A and two annular shoulder portions B which are axially outer the annular portions C, arranged on axially opposite sides with respect to the annular central portion A.

The annular central portion A and annular side portions C are intended to come into contact with the road surface when the motor vehicle travels in a straight line or slightly leaning, whereas the annular shoulder portions B are mainly intended to come into contact with the road surface when the motor vehicle turns a bend leaning to a greater extent.

With reference to FIGS. 2 and 4, the annular central portion A extends astride of the equatorial plane X-X for an axial extension lower than or equal to 50% of the axial extension of the tread band 8, for example equal to about 30% for the rear tyre and equal to about 20% for the front tyre.

Each annular extension C has an axial extension of the tread band lower than or equal to 25% of the axial extension of the tread band 8.

The pattern of the tread band 8 of the tyre of the present invention is defined by a plurality of primary grooves variously distributed along the circumferential and axial extension of the tread band 8 and by a plurality of secondary grooves arranged on the annular portions A and C.

The plurality of secondary grooves can also extend, but only in a minimal part, over at least one of the annular shoulder portions B.

In the embodiment shown in the figures the primary grooves are inclined with respect to the equatorial plane (X-X) and arranged on all the three portions A; B; C.

According to an important aspect of the present invention there is a difference in the empty/solid ratio on the annular central A and side C portions between a new tyre and a tyre that has traveled a distance of around 2000 km greater than or equal to 1.5%.

Preferably, the substantial disappearance of the secondary recesses at least on the annular central A and side C portion with respect to the new tyre occurs for a tyre that has traveled a distance of around 1500 km, more preferably around 1000 km.

Preferably, the substantial disappearance of the secondary recesses at least on the annular central A and side C portion with respect to the new tyre occurs for a tyre that has traveled a distance of around 750 km, more preferably around 500 km.

Preferably, the substantial disappearance of the secondary recesses at least on the annular central A and side C portion with respect to the new tyre occurs for a tyre that has traveled a distance of around 100 km, more preferably around 200 km.

Preferably, there is a difference in the empty/solid ratio on at least one annular side portion C between a new tyre and a tyre that has traveled a distance of around 2000 km greater than or equal to 4%.

The annular shoulder portions B have a difference in the empty/solid ratio between a new tyre and a tyre that has traveled a distance of around 2000 km.

According to an advantageous choice, in such an area there is a difference in the empty/solid ratio between a new tyre and smaller than or equal to 1.7%.

In particular, after travelling a distance of around 2000 Km the grooves of the plurality of secondary grooves, arranged in the central portion A and in the annular side portions C are almost totally removed by wear from the tread band modifying the tread pattern and in particular the empty/solid ratio thereof.

When the tyre is new, the secondary grooves of said plurality are arranged to form, together with the primary grooves, a first pattern, a decorative element or a graphical mark.

In particular, as better illustrated hereafter, the secondary grooves of said plurality are arranged to form, together with the primary grooves, a stylised angel.

When the tyre has traveled a distance of around 2000 Km, on the other hand, the secondary grooves are almost totally removed, deleted by wear from the tread band 8 and the grooves of the plurality of primary grooves form a second pattern, a decorative element or a graphical mark different from the first pattern.

In particular, as better illustrated hereafter, the primary grooves are arranged to form a stylised devil figure.

It is thus possible to obtain, in preselected areas of the tread band, decorative and/or graphical elements with a special appearance and a suggestive and communicative power that vary according to the wear of the tyre leaving the characteristics of steering, stability, grip and water drainage unchanged; indeed, the presence of secondary grooves improves the characteristics of the new tyre over the first kilometers of use, i.e. at a stage in which the tyre cannot yet fully fulfil its potentiality.

The central A and side C portions each have an empty/solid ratio greater than 7% when the tyre is new.

Such a choice gives these areas of the tread band excellent characteristics of drainage at the beginning of the tyre's lifetime.

After the tyre has traveled 2000 km, on the other hand, each central A and side C portion has an empty/solid ratio smaller than 20%.

Hereafter we shall describe in detail the tread pattern of the worn tyre, in other words of a tyre 1 that has traveled around 2000 km and on which just the primary grooves remain.

Structural details on the secondary grooves, on the other hand, shall be provided later on in the present description.

FIG. 3 shows a rear tyre that has traveled about 2000 km, the grooves of the plurality of primary grooves define, together with the grooves of the plurality of secondary grooves, a module $T_1$ that is replicated along the circumferential direction of the tyre 1.

The module $T_1$ comprises inclined pairs of grooves 20, 21 and 22 arranged symmetrically on axially opposite sides with respect to the equatorial plane X-X. The module $T_1$ is defined in FIG. 2 by a broken line indicated with r.

The module $T_1$ of the tread band 8 extends circumferentially for an angle preferably no greater than 90° and no smaller than 25°. Such an angle can for example be equal to about 45°.

Structural details on the grooves 20, 21 and 22 shall be provided later on in the present description.

The module $T_1$ also comprises pairs of grooves 30, 40 and 50 also arranged symmetrically on axially opposite sides with respect to the equatorial plane X-X.

Structural details on the grooves 30, 40 and 50 shall be provided later on in the present description.

Hereafter we shall describe in detail the tread pattern of the tyre 1 of the present invention with reference to a single side of the tread band 8 with respect to the equatorial plane X-X, whereas it is understood that what is described also applies to the other side of the tread band 8.

In the module $T_1$, the grooves 20 each extend along a respective broken line that preferably has at least two differently inclined rectilinear portions, more preferably three rectilinear portions, where each portion is inclined with respect to the equatorial plane X-X by a respective predetermined angle. However, it is possible to provide for a number of portions other than three.

Preferably, a first axially innermost portion 20a of the grooves 20 is inclined by an angle $\alpha 1$, a second axially intermediate portion 20b is inclined by an angle $\alpha 2$ larger than al and a third axially outermost portion 20c is inclined by an angle $\alpha 3$ larger than $\alpha 2$. The angle $\alpha 1$ is preferably between 0° and 20° and in the specific example of FIG. 3 it is equal to about 12°. The angle $\alpha 2$ is preferably between 15° and 35° and in the specific example of FIG. 3 it is equal to about 27°. The angle $\alpha 3$ is preferably between 45° and 65° and in the specific example of FIG. 3 it is equal to about 53°.

Each groove 20 extends overall on the tread band 8 starting from an inner area of the annular central portion A up to at least one axially outer portion of the respective annular shoulder portion B. For example, the overall circumferential extension of the grooves 20 is equal to about 80% of the module $T_1$.

Preferably, as shown in FIG. 3, the portions 20a extend over the annular central portion A, whereas the portions 20b extend over the respective annular side portions C and the portions 20c extend over the respective annular shoulder portions B.

For example, the circumferential extension of the portion 20a is no greater than 40% of the overall circumferential extension of the grooves 20, the circumferential extension of the portion 20b is no greater than 55% of the overall circumferential extension of the grooves 20 and the circumferential extension of the portion 20b is no greater than 20% of the overall circumferential extension of the grooves 20.

Preferably, the portion 20c is, at a free end portion 20d thereof, substantially triangle shaped.

The grooves 22 are circumferentially spaced from the grooves 20.

The grooves 22 also each extend along a respective broken line that preferably has at least two differently inclined rectilinear portions, more preferably three rectilinear portions, where each portion is inclined with respect to the equatorial plane X-X by a respective predetermined angle. Also in this case it is possible to provide for a number of portions other than three.

Preferably, a first axially innermost portion 22a of the grooves 22 is inclined by an angle γ1, a second axially intermediate portion 22b of the grooves 22 is inclined by an angle γ2 larger than γ1 and a third axially outermost portion 22c of the grooves 22 is inclined by an angle γ3 larger than γ2.

The angle γ1 is preferably between 15° and 35° and in the specific example of FIG. 3 it is equal to about 25°. The angle γ2 is preferably between 35° and 55° and in the specific example of FIG. 3 it is equal to about 43°. The angle γ3 is preferably between 45° and 65° and in the specific example of FIG. 3 it is equal to about 57°.

Each groove 22 extends overall on the tread band 8 substantially astride of the side portion C. Preferably, the overall circumferential extension of the grooves 22 is smaller than that of the grooves 20, for example equal to about 45% of the module $T_1$.

Preferably, as shown in FIG. 3, the portions 22a and 22b extend over the annular side portion C, whereas the portions 22c extend over the annular side portion B.

For example, the circumferential extension of the portion 22a is no greater than 45% of the overall circumferential extension of the groove 22, the circumferential extension of the portion 22b is no greater than 50% of the overall circumferential extension of the groove 22 and the circumferential extension of the portion 22b is no greater than 35% of the overall circumferential extension of the groove 22. The grooves 22 thus only minimally extend, or do not extend at all, over the central portion A, instead extending mostly on the annular side C and shoulder B portions.

For example, the grooves 22 extend on the central portion A for a portion having an axial length no greater than 20% of the overall axial length of the groove 22, preferably no greater than 10% of the overall axial length of said groove.

The grooves 21 are circumferentially spaced from the grooves 20 and 22 and arranged between them. They are defined by a single rectilinear portion preferably inclined with respect to the equatorial plane X-X by an angle β having a size between α1 and α2. The angle β is preferably between 10° and 30°. In the specific example illustrated in FIG. 3 such an angle is equal to about 20°.

However, it is possible to provide for grooves 21 formed of two or more rectilinear portions.

Each groove 21 extends circumferentially on the tread band 8 only at the central portion A and up to an axially outer portion of such a central portion A, touching at most a minimal part of the annular side portion C, but without therefore touching the respective annular shoulder portion B. Preferably, the overall circumferential extension of the grooves 21 is shorter than one third of the circumferential extension of the grooves 20. In the example of FIG. 3, the grooves 21 have a circumferential extension equal to about 25% of the module $T_1$.

Each of the grooves 21 preferably has an axially inner end portion arranged in a axially innermost position with respect to the axially inner end portions of the grooves 20 and 22.

Let us now go back to the grooves 30, 40 and 50 of the tread pattern of the tyre 1 of the present invention.

The grooves 30 are axially spaced from the grooves 20 and have a circumferential extension substantially equal to half that of said grooves 20.

The grooves 30 extend over the annular shoulder portions B of the tread band 8 and are inclined with respect to the equatorial plane X-X by an angle τ the size of which is preferably between 15° and 35° (in the specific example illustrated in FIG. 3 it is equal to about 25°) and they have a turned up free end portion 30a defined at the axially outermost portion of the annular shoulder portion B.

The grooves 40 are circumferentially spaced from the grooves 20 on a circumferentially opposite side with respect to the grooves 21. They have the same shape and size as the grooves 30 and they are inclined with respect to the equatorial plane X-X by an angle ω the size of which is preferably between 30° and 50° (in the specific example illustrated in FIG. 3 it is equal to about 41°).

The grooves 40 substantially extend over the annular side portions C of the tread band 8, possibly also touching the annular shoulder portions B only for a portion of small size. They have a turned up free end portion 40a defined at the axially outermost portion of the annular shoulder portion B.

The grooves 50, on the other hand, extend over only the annular central portion A of the tread band 8. They are circumferentially spaced from the grooves 40 on the opposite side with respect to the grooves 30 and are substantially triangle shaped, with the base of the triangle facing towards the equatorial plane and inclined by an angle δ that, in the example of FIG. 3, is taken in an opposite direction to that of all the other grooves described above and is equal to about 23°.

The circumferential extension of the grooves 50 is shorter than one third that of the grooves 30 and 40.

All of the grooves described above, with the exception of the grooves 50, the triangle-shaped free end portion of the grooves 20 and the turned up free end portions of the grooves 30 and 40, have an increasing axial size going from the annular central portion A towards the annular shoulder portion B. Such a characteristic, in combination with the inclination of the grooves, allows effective draining of water in wet road conditions, such drainage being made more effective by the fact that the grooves 20, 22, 30 and 40 extend over the opposite shoulder areas of the tyre 1.

Moreover, all of the grooves described above have substantially the same depth, which decreases moving from the annular central portion A towards the annular shoulder portions B.

Figure 5:
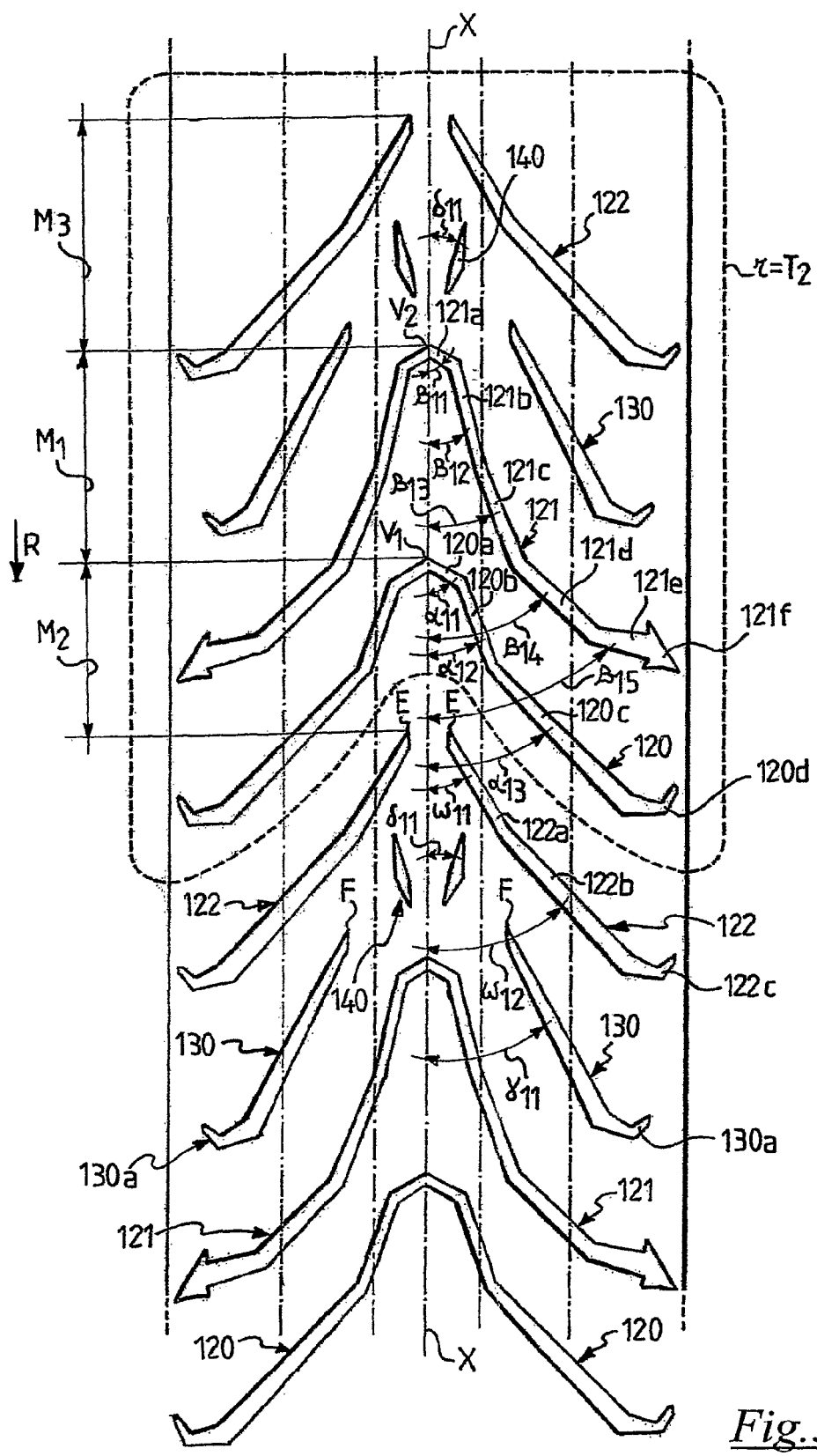
FIG. 5 shows a portion of the plan extension of a portion of the tread band of the front tyre of FIG. 4 after having traveled about 2000 km.

In the case of a front tyre, shown in FIGS. 4 and 5, the grooves of the plurality of primary grooves, jointly with the grooves of the plurality of secondary grooves, define a module $T_2$ that is replicated along the circumferential direction of the tyre 1.

In the front tyre shown in FIGS. 4 and 5, at each module $T_2$, the plurality of primary grooves comprises grooves 120, 121 and 122 that extend symmetrically from axially opposite sides with respect to the equatorial plane X-X.

Structural details on the grooves 120, 121 and 122 shall be provided later on in the present description.

Again at each module $T_2$, the tread band 8 of the rear tyre also comprises pairs of grooves 130 and 140 also arranged symmetrically on axially opposite sides with respect to the equatorial plane X-X.

Structural details on the grooves 130 and 140 shall be provided later on in the present description.

The groove 120 extends from an annular shoulder portion B to the opposite annular shoulder portion B along a respective broken line that crosses the equatorial plane X-X defining, at such an equatorial plane, a vertex V1.

Preferably, the aforementioned broken line has, at each side of the tread band 8 with respect to the equatorial plane X-X, at least two differently inclined rectilinear portions, more preferably three rectilinear portions, where each portion is inclined with respect to the equatorial plane X-X by a respective predetermined angle.

Preferably, a first axially innermost portion 120a of the groove 120 is inclined by an angle α11, a second axially intermediate portion 120b is inclined by an angle α12 smaller than all and a third axially outermost portion 20c is inclined by an angle α13 larger than α12. The angle α11 is preferably between 45° and 75° and, in the specific example of FIG. 5, it is equal to about 57°. The angle α12 is preferably between 10° and 30° and, in the specific example of FIG. 5, it is equal to about 20°. The angle α13 is preferably between 30° and 55° and, in the specific example of FIG. 5, it is equal to about 42°.

The shape of the groove 120 is thus substantially that of a V that increasingly widens moving away from the vertex V1. Such a vertex is defined by the intersection; at the equatorial plane X-X, of the two portions 120a of the two axially opposite portions of the groove 120.

The groove 120 extends overall on the tread band 8 of the front tyre for a portion having a circumferential extension equal to about 4.5% of the circumferential extension of the tread band 8, whereas it extends in the axial direction for a portion having an axial extension equal to about 90% of the axial extension of the tread band 8.

Preferably, the circumferential extension of the portion 120a is no greater than 10% of the overall circumferential extension of the groove 120, the circumferential extension of the portion 120b is no greater than 40% of the overall circumferential extension of the groove 120 and the circumferential extension of the portion 120c is equal to 50% of the overall circumferential extension of the groove 120.

Preferably, the portion 120c has, at an end portion 120d thereof, an end with opposite inclination to that of the other portions of the same groove.

The groove 121 is circumferentially spaced from the groove 120.

The groove 121 also extends from an annular shoulder portion B to the opposite annular shoulder portion B along a respective broken line that crosses the equatorial plane X-X defining, at such an equatorial plane, a vertex V2 orientated, with reference to the circumferential direction R, in the same direction as the vertex V1.

The distance M1 in the circumferential direction between the vertex V1 and the vertex V2 is no shorter than 3.5% of the overall circumferential extension of the tread band 8. More preferably, the distance M1 is no shorter than 3.7% of the overall circumferential extension of the tread band 8.

Preferably, the aforementioned broken line has, at each side of the tread band 8 with respect to the equatorial plane X-X, at least two differently inclined rectilinear portions, more preferably five rectilinear portions, where each portion is inclined with respect to the equatorial plane X-X by a respective predetermined angle. However, it is possible to provide for a number of portions other than five.

Preferably, a first axially innermost portion 121a of the groove 121 is inclined by an angle β11, a second axially outermost portion 121b with respect to the first portion is inclined by an angle β12 smaller than β11, a third axially outermost portion 121c with respect to the second portion is inclined by an angle β13 larger than β12, a fourth axially outermost portion 121d with respect t6 the third portion is inclined by an angle β24 larger than β13 and a fifth axially outermost portion 121e with respect to the fourth portion is inclined by an angle β15 larger than β14. The angle β11 is preferably between 45° and 70° and, in the specific example of FIG. 5, it is equal to about 57°. The angle β12 is preferably between 6° and 25° and, in the specific example of FIG. 5, it is equal to about 13°. The angle β13 is preferably between 10° and 30° and, in the specific example of FIG. 5, it is equal to about 21°. The angle β14 is preferably between 30° and 60° and, in the specific example of FIG. 5, it is equal to about 44°. The angle β15 is preferably between 60° and 85° and, in the specific example of FIG. 5, it is equal to about 74°.

The shape of the groove 121 is thus substantially that of a V that increasingly widens moving away from the vertex V2. Such a vertex is defined by the intersection, at the equatorial plane X-X, of the two portions 121a of the two axially opposite portions of the groove 121.

The groove 121 extends overall on the tread band 8 for a portion having a circumferential extension greater than that of the groove 120. Preferably, the groove 121 extends in the circumferential direction for a portion of length equal to about 6% of the circumferential extension of the tread band 8, whereas it extends in the axial direction for a portion having an axial extension equal to about 90% of the axial extension of the tread band 8.

Preferably, the circumferential extension of the portion 121a is no greater than 10% of the overall circumferential extension of the grooves 121, the circumferential extension of the portion 121b is no greater than 40% of the overall circumferential extension of the groove 121, the circumferential extension of the portion 121c is equal to about 25% of the overall circumferential extension of the groove 121, the circumferential extension of the portion 121d is equal to about 20% of the overall circumferential extension of the groove 121 and the circumferential extension of the portion 121e is equal to about 4% of the overall circumferential extension of the groove 121.

Preferably, the portion 121e is, at an end portion thereof 121f, substantially triangle shaped.

On the circumferentially opposite side to the groove 121 with respect to the groove 120, the tread band 8 of the front tyre also comprises a pair of grooves 122 inclined with respect to the equatorial plane X-X. The grooves 122 are arranged symmetrically on opposite sides with respect to the equatorial plane X-X and each extend, along a broken line, from a respective annular shoulder portion B up to the annular central portion A, without intersecting the equatorial plane X-X.

Between the axially inner free ends of the opposite grooves 122 a portion of tread band without primary grooves is thus provided, that extends in the axial direction for a portion no greater than 7% of the axial extension of the tread band 8.

Each groove 122 has an end E whose distance M2 in the circumferential direction from the vertex V1 of the groove 120 is shorter than 3.5% of the overall circumferential extension of the tread band 8 of the front tyre.

Preferably, the aforementioned broken line has two rectilinear portions differently inclined with respect to the equatorial plane X-X by a respective predetermined angle. However, it is possible to provide for a number of portions other than two.

Preferably, a first axially innermost portion 122a of the groove 122 is inclined by an angle coil and a second axially outermost portion 122b is inclined by an angle ω12 larger than ω11. The angle ω11 is preferably between 20° and 40° and in the specific example of FIG. 5, it is equal to about 30°. The angle ω12 is preferably between 30° and 60° and, in the specific example of FIG. 5, it is equal to about 40°.

Each pair of grooves 122 thus has an overall V shape interrupted at the vertex and that increasingly widens moving away from such a vertex.

Each groove 122 extends overall on the tread band 8 for a portion having a circumferential extension shorter than that of the grooves 120 and 121, and preferably equal to about 4.5% of the circumferential extension of the tread band 8 of the front tyre, whereas it extends in the axial direction for a portion having an axial extension equal to about 40% of the axial extension of the tread band 8.

Preferably, the circumferential extension of the portion 122a is no greater than 45% of the overall circumferential extension of the groove 122, whereas the circumferential extension of the portion 122b is no greater than 55% of the overall circumferential extension of the groove 122.

Preferably, the portion 122b has, at an end portion 122c thereof, an end with opposite inclination, with respect to the equatorial plane, to that of the other portions of the same groove.

Let us now go back to the grooves 130 and 140 of the tread pattern of the tyre 1 of the present invention.

The grooves 130 are circumferentially spaced from the grooves 122 on the opposite side to the groove 120 and each has a circumferential extension shorter than that of the grooves 122 and, preferably, no greater than 5% of the circumferential extension of the tread band 8.

The grooves 130 also each extend from a respective annular shoulder portion B towards the annular central portion A of the tread band 8, without crossing the equatorial plane X-X. They are defined by a single portion that is inclined with respect to the equatorial plane X-X by an angle γ11 of between 15° and 35°; in the example of FIG. 2 such an angle is preferably equal to 25°.

The axially outer end 130a of the grooves 130 is turned up like that of the grooves 122. Such free ends 130a axially extend over innermost annular portions of tread band 8 with respect to those on which the free ends 120d, 121f and 122c of the grooves 120, 121 and 122, respectively, extend. The axially inner free ends F of the grooves 130, on the other hand, extend on an axially outermost annular portion of tread band with respect to that on which the vertices V1 and V2 of the grooves 120 and 121, respectively, and the end E of the grooves 122 are defined.

The axial extension of each of the grooves 130 is thus shorter than that of the grooves 122 and is preferably equal to about 30% of the axial extension of the tread band 8.

Between the axially inner free ends F of the opposite grooves 130 an annular portion of tread band without primary grooves is therefore provided, that extends in the axial direction for a portion longer than that defined between the free ends E of the grooves 122.

The grooves 140 are formed on the annular central portion A of the tread band 8, symmetrically on opposite sides of the equatorial plane X-X. They are arranged in an axially inner position with respect to the grooves 122, at the portions 122a and 122b of such grooves. The grooves 140 are substantially triangle shaped, with the base of the triangle facing towards the equatorial plane X-X and inclined by an angle δ11 that in the example of FIG. 5 is in the opposite direction to that of all of the other grooves described above. Preferably, such an angle δ11 is equal to about 15%.

The circumferential extension of the grooves 140 is smaller than one third that of the grooves 122.

All of the grooves described above, with the exception of the grooves 140, the triangle shaped end portion 121f of the grooves 121 and the turned up end portions 120d, 122f, and 30a respectively of the grooves 120, 122 and 130, have an increasing axial size going from the annular central portion A towards the annular shoulder portions B. Such a characteristic, in combination with the inclination of the grooves, allows effective draining of water in wet road conditions, such drainage being made more effective by the fact that the grooves 120, 122 and 130 extend on the opposite annular shoulder portions B of the tyre 1.

Moreover, all of the grooves described above have substantially the same depth, which decreases moving from the annular central portion A towards the annular shoulder portions B.

According to an important aspect of the present invention, as stated previously both in the front tyre and in the rear tyre there is a difference in the empty/solid ratio on the annular central A and side C portions between a new tyre and a tyre that has traveled a distance of around 2000 km greater than or equal to 1.5%.

Preferably, the substantial disappearance of the secondary recesses at least on the annular central A and side C portions with respect to the new tyre occurs for a tyre that has traveled a distance of around 1500 km, more preferably around 1000 km.

Preferably, the substantial disappearance of the secondary recesses at least on the annular central A and side C portions with respect to the new tyre occurs for a tyre that has traveled a distance of around 750 km, more preferably around 500 km.

Preferably, the substantial disappearance of the secondary recesses at least on the annular central Ac and side C portions with respect to the new tyre occurs for a tyre that has traveled a distance of around 100 km, more preferably around 200 km.

Preferably, there is a difference in the empty/solid ratio on each of the side portions C between a new tyre and a tyre that has traveled a distance of around 2000 km greater than 4%.

On each of the shoulder portions B there is a difference in the empty/solid ratio between a new tyre and a tyre that has traveled a distance of around 2000 km smaller than or equal to 1.7%.

In other words, after having traveled about 2000 Km the grooves of the plurality of secondary grooves, arranged in the central portion A and in the annular side portions C are removed by wear from the tread band modifying the tread pattern.

Advantageously, for this purpose the grooves of the plurality of secondary grooves have a depth smaller than 1 mm, preferably smaller than 0.7 mm.

The grooves of the plurality of primary grooves with the grooves of the plurality of secondary grooves define a module T'$_1$ that is replicated with a predetermined pitch along the circumferential direction of the new tyre 1.

It is defined in FIG. 2 by a broken line indicated with r.

The module T'$_1$ of the tread band 8 extends circumferentially for an angle preferably no greater than 90° and no smaller than 20°. Such an angle can for example be equal to about 45°.

In each module T'$_1$ the plurality of secondary grooves, jointly with a portion of the primary grooves, mainly those arranged in the central A and side C portions define a pattern, a decorative element or a graphical mark when the tyre is new.

In particular, in the embodiment of FIGS. 2 and 4 the plurality of primary grooves, with a portion of the secondary grooves, define a graphical mark representing an angel when the tyre is new.

In detail, in the new front tyre shown in FIG. 4 the plurality of secondary grooves are represented by the grooves 101-105.

To make the angel the secondary grooves 101-105 are arranged symmetrically with respect to the equatorial plane X-X.

In particular, the groove 101 that represents the angel's halo is arranged in the central portion A substantially astride of the equatorial plane X-X and has a substantially helicoid shape.

The groove 101 is positioned circumferentially in an intermediate position between the free ends of the grooves 122 and the top ends of the grooves 140.

The grooves 102 that represent the angel's eyes, opposing one another with respect to the equatorial plane X-X, are arranged in the central portion A.

The grooves 102 are positioned inside the grooves 140 in a axially innermost position with respect to the circumferentially top end thereof.

Each of the grooves 102 has an axial extension of between 3 mm and 7 mm, for example equal to about 5 mm and a maximum width measured in the axial direction no greater than 3 mm, for example equal to 1 mm.

The grooves 101, jointly with the grooves 102 and 140, make the angel's face in the front tyre.

The grooves 103, 104, 105 represent part of the angel's wings.

The grooves 103 are opposite one another with respect to the equatorial plane and extend in the circumferential portions A and C.

Each groove 103 has a substantially parabolic shape with a concavity facing in the same way as the direction in which the tyre rolls, represented by the arrow R.

Each groove 103 extends circumferentially between the groove 122 and the groove 130 so that the concavity substantially surrounds the end of the groove 130.

The grooves 104, just like the grooves 105, are opposite one another with respect to the equatorial plane X-X and extend mainly in the circumferential portions C.

The grooves 104, just like the grooves 105, extend substantially parallel to the equatorial plane X-X between the groove 130 and the groove 121.

The grooves 105 have a greater extension in the circumferential direction than the circumferential extension of the grooves 104.

The grooves 104, 105 have a maximum width no greater than 5 mm, preferably no greater than 3 mm, for example equal to 2 mm.

The grooves 105, together with the grooves 121, make the bottom portion of the angel's wings in the tyre.

In the rear tyre shown in FIG. 2 the plurality of secondary grooves are represented by the grooves 11-18.

To make the angel the secondary grooves 11-18 of the rear tyre are arranged symmetrically with respect to the equatorial plane X-X.

In particular, the groove 11 represents the angel's halo and is arranged in the central portion A substantially astride of the equatorial plane X-X and has a substantially ellipse shape.

The groove 11 is positioned circumferentially in an intermediate position between the grooves 22 and the top ends of the circumferentially consecutive grooves 50.

The grooves 12 that represent the angel's eyes are opposite one another with respect to the equatorial plane X-X and are arranged in the central portion A.

The grooves 12 are positioned inside the grooves 50 in a axially innermost position with respect to the circumferentially top end thereof.

Each of the grooves 12 has an axial extension of between 3 mm and 13 mm, for example equal to about 9 mm and a maximum width measured in the axial direction no greater than 5 mm, for example equal to 3 mm.

The grooves 13, 14, 15, 16, 17, 18 represent part of the angel's wings.

The grooves 13 are opposite one another with respect to the equatorial plane X-X and extend in the circumferential portions A and C.

Each groove 13 is inclined with respect to the equatorial plane X-X and extends substantially from the axially innermost end of the groove 40 to the axially innermost end of the groove 20.

The grooves 15 are opposite one another with respect to the equatorial plane X-X and preferably extend in the circumferential shoulder portions B or in areas which are astride of the side portions C and the shoulder portions B.

Each groove 15 has a substantially parabolic shape with a concavity facing axially outwards.

Each groove 15 extends circumferentially between the axially outer end of the groove 40 and the groove 30.

The grooves 16, like the grooves 15, are opposite one another with respect to the equatorial plane X-X and preferably extend in the circumferential shoulder portions B or in areas which are astride of the side portions C and the shoulder portions B.

The grooves 16 in any case extend in a more inner axial position with respect to the grooves 15.

Each groove 16 has a substantially parabolic shape with a concavity facing in the opposite direction to the direction of rolling R.

Each groove 16 extends circumferentially between the groove 30 and the groove 20.

The grooves 14, just like the grooves 18, are opposite one another with respect to the equatorial plane X-X and extend mainly in the circumferential portions A and C.

The grooves 14, just like the grooves 18, extend substantially parallel to the equatorial plane X-X.

The grooves 14, just like the grooves 18, do not have an extension in the circumferential direction along the same plane, but in two substantially parallel planes.

Each groove 14 extends circumferentially from the axially inner end of a groove 40 to the groove 20.

Each groove 18, on the other hand, extends circumferentially from the axially inner end of a groove 20 to the axially inner end of a groove 21.

The grooves 17 are opposite one another with respect to the equatorial plane X-X and extend mainly in the circumferential portions C.

Each groove 17 is inclined with respect to the equatorial plane X-X and extends substantially from the axially innermost end of the groove 20 to the axially innermost end of the groove 21.

The grooves 13-18 have a maximum width no greater than 7 mm, preferably no greater than 5 mm, for example equal to 4 mm.

The grooves 15, 16, 17, jointly with the grooves 21, 20, 30, make the bottom portion of the angel's wings in the rear tyre.

As stated earlier, having traveled about 2000 Km the grooves of the plurality of secondary grooves, both for the rear tyre and front tyre arranged in the central portion A and in the annular side portions C, are removed by wear from the tread band 8.

Consequently, the angel represented by such grooves is almost completely deleted.

In other words, having traveled about 2000 km on the tread band, only the grooves of the plurality of primary grooves or possibly some grooves or parts of grooves of the plurality of secondary grooves remain. In this last case the secondary grooves that remain are arranged almost exclusively on the annular shoulder portions B.

The tread pattern of the tread band is modified and the remaining grooves define a graphical and/or aesthetic design which is different from the original one.

In particular, an ornamental design that shows a stylised devil figure.

Thus after having traveled a distance of around 2000 Km the disappearance of the grooves/secondary recesses determines a modification in the tread pattern that goes from a first representation to a second representation. Such a variation can advantageously be used as a marketing strategy to transmit to the customer messages or indications and/or as a different form of communication.

For example, the choice of representing the new tyre with an angel and the tyre after the first period of use with a stylised devil figure, intuitively indicates to the driver of the vehicle two driving stages with different characteristics.

Indeed, whereas when the tyre is new the driver should drive more carefully (or "angelically"), after the initial transition period of about 2000 km the tyre is able to totally fulfil its potentiality, and the driver can allow himself to drive more freely (or "devilishly").

According to a particularly advantageous aspect, the front and rear tyres described above can be mounted as a pair on a motor vehicle.

In such a case the Applicant has found that on the annular central portion A the rear tyre can have an even greater difference in the empty/solid ratio with respect to those described previously, whereas in the annular shoulder portions B of the front tyre it can have a difference in the empty/solid ratio tending to zero.

According to this choice, almost all of the pattern formed from the secondary grooves is arranged in the rear tyre in the area most subject to wear.

Vice-versa, in the front tyre the shoulder portions are substantially without the secondary grooves that could have a negative influence upon the driving characteristics when fully leaning to travel a bend.

In particular, there is a difference in the empty/solid ratio on the annular portion A between a new rear tyre and a rear tyre that has traveled a distance of around 2000 km greater than or equal to 4%, for example equal to 4.5%.

On each annular side portion C there can be a difference in the empty/solid ratio between a new rear tyre and a rear tyre that has traveled 2000 km greater than or equal to 4%, for example equal to 4.2%.

On the annular shoulder portion B there can be a difference in the empty/solid ratio between a new rear tyre and a rear tyre that has traveled a distance of around 2000 km smaller than or equal to 2%, for example equal to 1.2%.

On the annular shoulder portion B there can be a difference in the empty/solid ratio between a new front tyre and a rear tyre that has traveled a distance of around 2000 km smaller than or equal to 0.5%.

On the annular portion A there is a difference in the empty/solid ratio between a new rear tyre and a rear tyre that has traveled a distance of around 2000 km greater than or equal to 4.5%.

Of course, a man skilled in the art can bring further modifications and variants to the invention described above in order to satisfy specific and contingent application requirements, these variants and modifications in any case being covered by the scope of protection as defined by the following claims.

For example, the substantial disappearance of the grooves or secondary recesses from the annular central A and side C portions, as stated earlier, can also occur before 2000 km of travel.

Also in these cases, however, there is a substantial disappearance of the grooves or of the secondary recesses after 2000 km.

Moreover, the grooves or secondary recesses can also be provided in just one of the tyres of a pair to be mounted on a motor vehicle. Preferably, such a solution can be adopted on just the rear tyre.

The invention claimed is:

1. A tyre for motor vehicles comprising a tread band, comprising an annular central portion astride an equatorial plane of the tyre, two annular shoulder portions arranged on axially opposite sides with respect to the annular central portion and two annular side portions each arranged between the annular central portion and a respective annular shoulder portion, the tread band comprising at least one module replicated along a circumferential direction of the tyre and comprising:

at least one plurality of primary grooves inclined with respect to the equatorial plane and arranged at least on the annular side and shoulder portions; and at least one plurality of secondary recesses arranged mainly on the annular central portion and on at least one annular side portion, wherein the at least one plurality of secondary recesses is arranged to form, jointly with the at least one plurality of primary grooves, a first pattern, wherein the at least one plurality of primary grooves defines a second pattern different from said first pattern such that, in a new tyre that has travelled a distance of about 2000 km, the secondary recesses substantially disappear at least in the annular central portion and in at least one of the annular side portions, and wherein the difference in an empty/solid ratio on the annular central portion and the annular side portions between the first pattern and the second pattern is greater than 1.5%.

2. The tyre according to claim 1, wherein a substantial disappearance of the secondary recesses determines a difference in empty/solid ratio on at least one annular side portion between a new tyre and a tyre that has travelled a distance of about 2000 km greater than or equal to 4%.

3. The tyre according to claim 1, wherein a substantial disappearance of the secondary recesses determines a difference in the empty/solid ratio on at least one annular shoulder portion between a new tyre and a tyre that has travelled a distance of about 2000 km smaller than or equal to 1.7%.

4. The tyre according to claim 1, wherein each of the central and side portions, when the tyre is new, has an empty/solid ratio greater than 7%.

5. The tyre according to claim 1, wherein the central and side portions, after the tyre has travelled at least 2000 km, have an empty/solid ratio less than 20%.

6. The tyre according to claim 1, wherein a plurality of secondary recesses is arranged at least in a minimal part on at least one of the annular shoulder portions.

7. The tyre according to claim 1, wherein a plurality of secondary recesses has a depth no greater than 1 mm.

8. The tyre according to claim 1, wherein the secondary recesses are arranged to form, together with the primary grooves, a first pattern, a decorative element or a graphical mark.

9. The tyre according to claim 1, wherein secondary recesses are arranged symmetrically with respect to the equatorial plane.

10. The tyre according to claim 1, wherein the primary grooves are arranged symmetrically with respect to the equatorial plane.

11. The tyre according to claim 1, wherein the secondary recesses of the central portion and of the side portions in a tyre that has travelled a distance of about 2000 km, are substantially removed.

12. The tyre according to claim 1, wherein the primary grooves of the tread band, once the secondary recesses of the central portion and of the side portions disappear after the tyre has travelled a distance of about 2000 km, make a second pattern, a decorative element or a graphical mark different from said first pattern.

13. The tyre according to claim 1, wherein a plurality of secondary recesses of each module extends in a circumferential direction for a portion no greater than 30% of an overall circumferential extension of the tread band.

* * * * *